United States Patent Office

PTO - BOYERS, PA Duty Station

MISSING PAGE TEMPORARY NOTICE

PATENT # 6949X FOR ISSUE DATE 2-28-1832 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All drawings

Data Conversion Operation

Boyers, Pa

6949X

UNITED STATES PATENT OFFICE.

SAMUEL OGLE, OF FREDERICKTOWN, MARYLAND.

IMPROVEMENT IN PLOWS.

Specification forming part of Letters Patent dated February 28, 1832.

*To all whom it may concern:*

Be it known that I, SAMUEL OGLE, living near Fredericktown, in the county of Frederick and State of Maryland, have made an improvement in the plow patented to me on the 9th day of June, 1818, of which the following is a specification.

The improvement in the plow for which I obtained Letters Patent on the 9th day of June, 1818, is described in the words following, to wit: As I make use of the common plow I do not claim any part of it as my invention, except what is to be hereinafter described, though I have reason to believe I was either the first or one of the first who made use of a cast-iron mold-board in the manner that is now used. This, however, does not form the subject of my present patent.

What I claim as my peculiar invention or discovery is an iron landside. This landside is cast or made separately, and attached to the mold-board by screws or otherwise.

The advantages arising from this improvement, are the plow can be made shorter than in the common way, and by the landside fitting closely to the center piece and mold-board excludes the dirt, and causes it to plow much easier and better than in the common mode.

The improvement which I now have made and assigned to Samuel Witherow, to whom I pray Letters Patent may be granted therefor, is described as follows: It consists in making the fore part of the landside sharp and increasing its height so as to reach to or enter the beam.

The advantages arising from this improvement are, the common colter can be dispensed with, the plow runs much lighter, and is much less liable to choke, and the landside, which is cast and made separate and fastened to the mold-board and center piece (which is made of wood) by screws or otherwise, when worn out can be replaced by a new one without affecting the mold-board.

SAMUEL OGLE.

Witnesses:
GEO. ROHR,
W. C. RUSSELL.